US008565725B2

(12) United States Patent
Metivier

(10) Patent No.: US 8,565,725 B2
(45) Date of Patent: Oct. 22, 2013

(54) SECURE CONTROL SYSTEM FOR OPENING LOCKING DEVICES BY ENCRYPTED ACOUSTIC ACCREDITATIONS

(75) Inventor: Pascal Metivier, Fleucherolles (FR)

(73) Assignee: Openways SAS, Feucherolles (FR)

( * ) Notice: Subject to any disclaimer, the term of this patent is extended or adjusted under 35 U.S.C. 154(b) by 54 days.

(21) Appl. No.: 13/386,232

(22) PCT Filed: Jul. 16, 2010

(86) PCT No.: PCT/FR2010/051500

§ 371 (c)(1), (2), (4) Date: Mar. 2, 2012

(87) PCT Pub. No.: WO2011/010052

PCT Pub. Date: Jan. 27, 2011

(65) Prior Publication Data

US 2012/0157079 A1 Jun. 21, 2012

(30) Foreign Application Priority Data

Jul. 21, 2009 (EP) .................................... 09166002

(51) Int. Cl.
*H04M 1/66* (2006.01)

(52) U.S. Cl.
USPC ........... 455/410; 455/411; 455/418; 455/419; 455/426.2

(58) Field of Classification Search
USPC ................. 455/410, 411, 418, 419, 420, 425, 455/426.1, 426.2
See application file for complete search history.

(56) References Cited

U.S. PATENT DOCUMENTS

| | | | | |
|---|---|---|---|---|
| 2007/0197194 | A1* | 8/2007 | Oyagi et al. | 455/411 |
| 2007/0200671 | A1* | 8/2007 | Kelley et al. | 340/5.72 |
| 2009/0141890 | A1* | 6/2009 | Steenstra et al. | 380/44 |

FOREIGN PATENT DOCUMENTS

| | | |
|---|---|---|
| DE | 10054633 | 4/2002 |
| DE | 10321307 | 12/2004 |
| EP | 1703479 | 9/2006 |
| GB | 2364202 | 1/2002 |
| GB | 2402840 | 12/2004 |
| WO | WO 00/35178 | 6/2000 |
| WO | WO 02/095689 | 11/2002 |
| WO | WO 2006/136662 | 12/2006 |

OTHER PUBLICATIONS

International Search Report for PCT/FR2010/051500 mailed Oct. 21, 2010.

* cited by examiner

*Primary Examiner* — Kathy Wang-Hurst
(74) *Attorney, Agent, or Firm* — Nixon & Vanderhye P.C.

(57) ABSTRACT

The invention relates to a system implements a mobile phone (20) available to a user (18) authorized to open a lock (22). A remote management site (10) includes a database (12) of locks and authorized users identified by the mobile phone number thereof, as well as a generator (14) of accreditation data. The accreditations are encrypted acoustic accreditations in the form of single-use audio signals, capable of enabling the opening of locks that are indexed in the database. The system includes means for securely transmitting the encrypted acoustic accreditations from the management site to the mobile phone of the corresponding authorized user via a mobile network operator (16). The lock (22) includes an electroacoustic transducer that is capable of sensing the acoustic accreditations reproduced by the telephone placed beforehand near the lock, as well as a means for recognizing, analyzing, and authenticating the sensed acoustic accreditations, and controlling the unlocking of the mechanical members upon recognizing a compliant accreditation.

15 Claims, 2 Drawing Sheets

SECURE CONTROL SYSTEM FOR OPENING LOCKING DEVICES BY ENCRYPTED ACOUSTIC ACCREDITATIONS

This application is the U.S. national phase of International Application No. PCT/FR2010/051500 filed 16 Jul. 2010 which designated the U.S. and claims priority to EP 09166002.7 filed 21 Jul. 2009, the entire contents of each of which are hereby incorporated by reference.

The invention relates to the locks controlled by means of a dematerialized and encrypted key, such key being conveyed by a portable object held by a user.

The portable object, when brought in the vicinity of the lock, acts as a key for actuating the opening of the lock by means of encrypted data, hereinafter referred to as "accreditation" (or credential). The accreditation can be protected through various coding and encryption methods implemented in the lock and/or in the portable object and making it possible to protect the lock and the portable object against fraudulent manipulations, and to secure the communication between these two elements.

Various systems of microcircuit cards or badges are known, implementing a non-galvanic wireless coupling with the lock, generally an induction coupling. Such coupling provides bidirectional communication between the lock and the badge, making it possible in particular for the lock to read the accreditation data from the memory of the badge and to actuate the opening if the data is recognized as being compliant.

One drawback of such method is the need for a specific portable object, which has to be given to the user and which the latter has to keep with him.

This leads further to the multiplication of portable objects, each corresponding to a different lock (home, office, building door, garage, etc.), so that the whole becomes finally awkward and is subjected to risks of forgetting.

Moreover, the system is a fixed system, insofar as if it is desired to update the authorizations, cancel existing authorizations or create new ones, the portable object has to be replaced or the memory of the latter has to be updated by means of a protocol and/or a specific drive, with always the need for physically handling and displacements.

A recently developed method consists in using instead of a dedicated badge a mobile phone equipped with an NFC (Near Field Communication) chip and an NFC antenna, with the UICC card (SIM card) of the phone being used as a security element. Placing the phone in communication with a management site makes it possible to easily modify the accreditations stored in the phone or in the SIM card, to make in-line checks, to modify the security elements or to download new ones, etc.

The major drawback of such method is that it necessitates a phone specially equipped to implement the NFC technology. Such technologies exist and are perfectly finalized, but todays a very limited park of devices is available, hampering any fast generalization of the system.

One object of the invention is to propose a lock management and control method showing a maximum security level, a very high flexibility of implementation, and which can be used with any conventional mobile phone, not necessarily provided with NFC circuits; in other words, a method that can be used with a pre-existing phone, without the need for the user to replace his device by an NFC model, and without the need for an additional portable object such as a badge or a card.

Therefore, the system of the invention will be immediately generalizable to the largest number of people, usable by any one from a standard model of phone, without modification, but with all the security and all the flexibility peculiar to the modern cryptographic methods.

The principle of the invention lies in the use of encrypted acoustic accreditations. Such acoustic accreditations are, for example, in the form of a coded series of tones (DTMF tones or others), emitted by the loudspeaker of an emitting device and picked up by the microphone of a receiving device.

In the case of the invention, such encrypted acoustic accreditations are "downward" accreditations, i.e. they come from a remote management site and are transmitted to the mobile phone of the user through the network of the telephony operator. To use the accreditation, the user brings his phone in the vicinity of the lock and triggers the emission of the series of tones corresponding to the encrypted acoustic accreditation by the loudspeaker of his phone, so that these tones can be picked up by a microphone that is integrated in the lock or coupled thereto. The latter decodes the accreditation, checks it and, in case of compliance, unlocks the mechanical members.

The use of acoustic accreditations is not new in itself and has already been proposed in other contexts and for other applications, for example by the WO 2008/107595 A2 (Tagattitude).

This document describes a method of securing the logical access to a computer network by a remote terminal, for example by a computer connected to this network via Internet. The user connects to the network with his computer and simultaneously powers up his phone and, by means of the latter, calls a control site interfaced with the network to which the access is requested. To check the user's authorization, the network sends an audio signal (acoustic accreditation) to the remote computer that has just connected, and this signal is reproduced by the loudspeaker of the computer. The user having placed his phone in front of the loudspeaker, this audio signal is picked up by the phone, transmitted to the remote control site via the mobile phone network operator and "listened to" by the control site, which can then check the accreditation and authorize the access to the computer network by the terminal. It will be observed that, in this case, it is an "upward" accreditation: the acoustic accreditation is picked up by the microphone of the phone, which forwards it to the control site. Knowing the origin of the phone call, the control site can identify the user through the mobile phone used for that operation, and thus authorize the logical access to the network by the terminal located in the vicinity of the thus-identified phone.

More precisely, the present invention relates to a secured system for controlling the opening of lock devices, comprising, in a manner known in itself: at least one lock device provided with electronic circuits for controlling locking/unlocking mechanical members; a mobile phone at the disposal of a user authorized to open the lock device; a remote management site; and a mobile network operator, coupled to the management site and to the mobile phone.

Characteristically of the invention, the remote management site comprises a database of lock devices and authorized users with, for each user, a unique identifier associated with a mobile phone number, and data about access rights and conditions of use, and a generator of accreditation data, the accreditations being encrypted acoustic accreditations in the form of single-use audio signals, adapted for allowing the opening of the lock devices that are indexed in the database. Besides, the system comprises means for secured transmission of said accreditation data from the management site to the mobile phone of the corresponding authorized user; the phone comprises an electroacoustic transducer capable of reproducing said acoustic accreditations; the lock device comprises an electroacoustic transducer capable of picking up the acoustic accreditations reproduced by the phone's transducer previously placed in the vicinity of the lock device; and the lock device comprises means for recognizing, analyzing and authenticating the acoustic accreditations picked up by the transducer, and operating the unlocking of the mechanical members upon recognizing a compliant accreditation.

In a first embodiment, the system comprises means adapted for, upon the sending of a request by the mobile phone to the management site: verifying the user's authorization in the database of the site; generating an acoustic accreditation by the generator of the site; and transmitting said accreditation to the phone, for direct reproduction by the transducer of the latter previously placed in the vicinity of the lock device's transducer.

In a second embodiment, the system comprises means adapted for, upon the sending of a request by the mobile phone to the management site: verifying the user's authorization in the database of the site; generating at least one acoustic accreditation by the generator of the site; transmitting said accreditation(s) to the phone, by implementing an internal applet of the phone capable of performing the download and memorization thereof into a memory of the phone; and, in a second time, activating the internal applet for reproducing the accreditation, or one of the accreditations, by the phone's transducer previously placed in the vicinity of the lock device's transducer.

In a third embodiment, the phone comprises an internal applet forming, in combination with a cryptographic key, a cryptographic generator, and the accreditation data transmitted by the remote site to the phone is said cryptographic key, so as to operate, upon a request from the user, the generation of the acoustic accreditation by the internal applet and the reproduction thereof by the phone's transducer previously placed in the vicinity of the lock device's transducer.

In the latter case, the cryptographic key, and possibly the applet, can be stored in a memory of a secured microcircuit card of the phone, and the system may further comprise means for conditioning the generation of the acoustic accreditation by the internal applet of the phone to the updating, by the remote site, or by the mobile network operator, of a validation data required so that the applet can continue performing said generation.

In a fourth embodiment, the system comprises means adapted for, upon the sending of a request by the mobile phone to the management site, or on initiative of the management site: verifying the user's authorization in the database; generating at least one acoustic accreditation and converting said accreditation(s) into an audio file; transmitting said audio file to the phone for download and memorization into a memory of the phone; and, in a second time, reproducing the audio file by the phone's transducer previously placed in the vicinity of the lock device's transducer.

According to various advantageous subsidiary characteristics:

- in the case of the first and fourth above-mentioned embodiments, the system further comprises means for automatically generating said request from a predefined threshold of accreditations remaining memorized in the phone, so as to operate a reloading of the phone's memory with new accreditations;
- the system further comprises means for conditioning the reproduction of the acoustic accreditation by the phone's transducer to the previous presentation of a personal validation data delivered by the user to the phone;
- the lock device comprises an electroacoustic transducer capable of reproducing return acoustic signals, generated by the lock device and coded with state or history data peculiar to the lock device; and the phone comprises an electroacoustic transducer capable of picking up said return signals;
- in the latter case, the phone may further comprise means for decoding said return signal and displaying, if need be, to the user, an alert message based on said state or history data peculiar to the lock device, and/or comprise means for transmitting to the management site said return signals with said state or history data peculiar to the lock device;
- when the user is authorized for a plurality of different lock devices, the phone is capable of reproducing a plurality of accreditations within a single burst, said burst containing an accreditation corresponding to each of the lock devices for which the user is authorized;
- the phone further comprises a fast access feature for obtaining and/or reproducing the accreditation by pressing a dedicated button on the phone or by activating a specific icon of a touch surface of the phone;
- the system is also capable of controlling the activation/deactivation of an alarm equipment upon recognizing a compliant accreditation.

Various exemplary embodiments of the invention will now be described, with reference to the appended drawings in which same reference numbers designate identical or functionally similar elements through the figures.

FIG. 1 schematically illustrates the main elements contributing to the operation of the system according to the invention;

Figure 1:
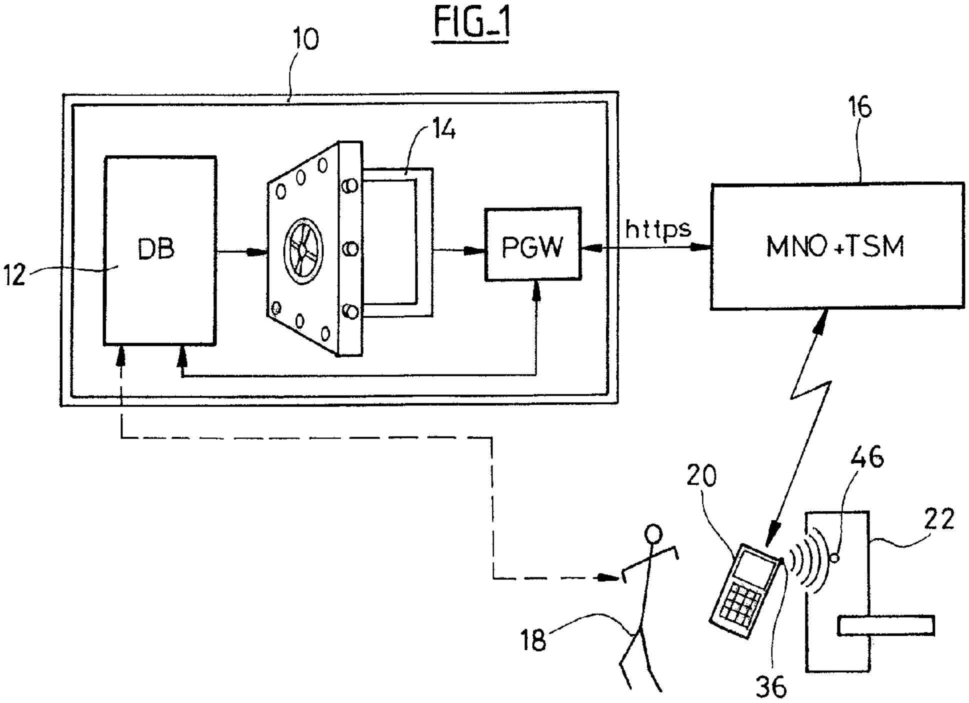

The principle of implementation of the invention will now be described with reference to FIGS. 1 and 2.

One of the essential elements of the invention is a secured management site 10 centralizing in a database DB 12 the information for inventorying and identifying a number of lock devices and users authorized for each of said lock devices. For each user, the database indexes a unique mobile phone number associated with this user, as well as data about access rights and conditions of use (access reserved to some days or some time slots, expiry date of an access right, etc.). Each lock is indexed by means of a Unique Identifier, UID, which is uniquely assigned.

The management site 10 also comprises a cryptographic motor forming a generator 14 of accreditation data.

Characteristically of the invention, the "accreditation data" (credentials) are encrypted acoustic accreditations in the form of single-use audio signals, for example (but not limitatively) consisted of a succession of double DTMF tones. These audio signals are designed so that they can be conveyed by the audio transmission channels (voice channel) of a mobile phone network, after having been digitized.

The management site 10 is coupled to a network of a mobile phone operator, or MNO (Mobile Network Operator), through an audio phone gateway PGW (Phone GateWay) and a secured connection, for example an IP connection of the https type.

The mobile phone network 16 is conventionally used by the various subscribers thereof, each user 18 having his own mobile phone 20, which is individualized by the information of the SIM card contained in the phone or by another unique element if the phone operates without a SIM card. Then, when he uses his personal mobile phone, a user is recognized and identified by the network 16 by means of his subscriber number, and thus in the same way by the management site 10.

The securing of the connection between the mobile network 16 and the mobile phone 20 may be operated through a Trusted Service Provider, or TSM (Trusted Service Manager), capable of efficiently and securely ensuring the various hereinafter-described procedures of exchange or download of information between the management site 10 and the mobile phone 20, via the phone network operator 16.

In the case of a key materialized by a medium such as a card or a badge, a significant part of the security is ensured by the physical delivery of this object to the lawful user, in the same way as the delivery of a set of keys. On the other hand, within the framework of the invention, the object used is a mobile phone, hence an unmarked object. But the latter is recognized and authenticated by the SIM card it contains (or by another unique element) and that, above all, identifies the user via his phone number (subscriber number). The management site 10 is thus able to identify a phone to which it has been connected via the mobile network operator 16 as being actually the phone of the authorized user 18, indexed in its database 12.

The basic principle of the invention consists in making the loudspeaker of the mobile phone 20 reproducing, as an audio signal, the encrypted acoustic accreditation generated by the cryptographic generator 14 and transmitted as a voice signal through the phone gateway PGW and the operator of the phone network 16.

This accreditation reproduced by the mobile phone 20 is intended to be picked up by a microphone of a lock device 22 so as to control the opening of this lock device.

As used herein, "lock device" means not only a lock strictly speaking, i.e. a mechanism applied for example on a door so as to prevent the opening thereof, but also any device making it possible to obtain a comparable result, for example a lock barrel considered solely, or a more specific locking device comprising various members not grouped together in a same lock case, the final purpose being to prevent, through mechanical means, the physical access to a given place or space, and to allow access to that place or space through unlocking of the lock device, upon a request from the user, after having checked that this user has actually the access rights (i) that are peculiar to him and (ii) that are peculiar to the lock device.

For the simplicity of the description, it will be hereinafter simply referred to a "lock", but this term has to be understood in its wider sense, without any limitation to a particular type of equipment.

Figure 2:
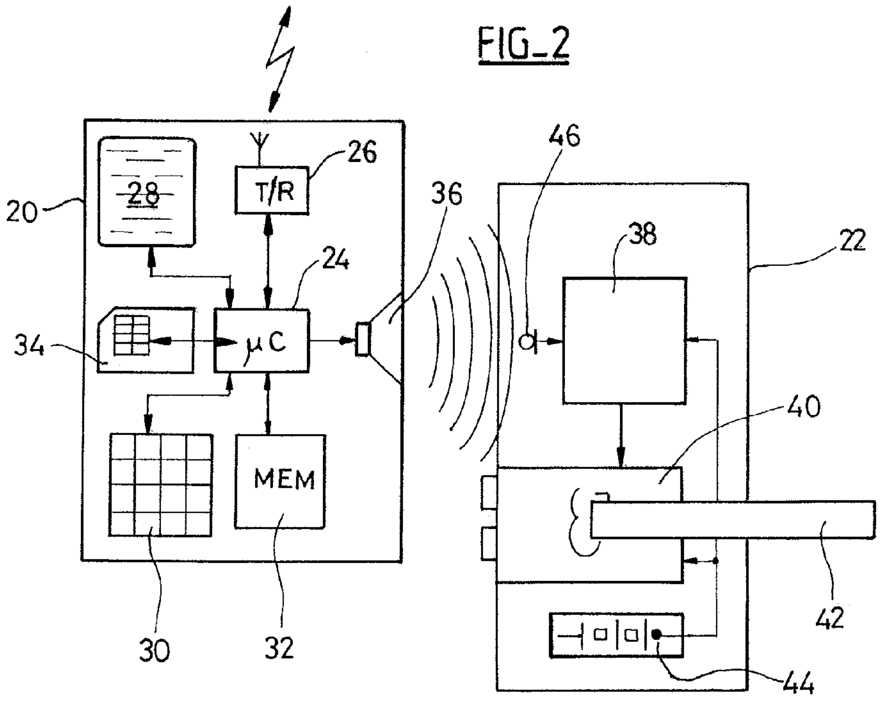
FIG. 2 illustrates more precisely, as a block diagram, the main members constituting the mobile phone and the lock to which the latter is coupled.

FIG. 2 illustrates, as a block diagram, the main members of the mobile phone 20 and of the lock 22.

The phone 20 comprises a microcontroller 24 coupled to various peripheral members such as emitting/receiving circuit 26, display 28, keyboard 30, data memory 32, UICC (Universal Integrated Circuit Card, corresponding to the "SIM card" for the GSM phone functions) 34, and acoustic transducer 36.

The lock 22 comprises a microcontroller 38 as well as an electromechanical system 40 for operating the unlocking of a sliding bolt or a handle 42 upon a command from the microcontroller 38. The lock comprises its own power supply means, in the form of a battery 44, so as to be electrically autonomous. An external power supply is however possible.

Moreover, the lock 22 is individualized by means of a Unique Identifier, UID, which is a programmable identifier, indexed in the database 12 of the management site 10, making it possible to recognize uniquely one lock among all of them.

Characteristically, the lock 22 is further provided with an acoustic transducer in the form of a microphone 46 for picking up the surrounding audio signals, in particular the acoustic accreditation that will be reproduced by the loudspeaker 36 of the phone 20, and transforming the picked up acoustic signals into electric signals applied to the microcontroller 38 for being decoded, checked and for possibly operating the unlocking of the mechanical members 40.

Modes of Implementation of the Invention

Various operating modes for implementing the invention with the different elements of the system just described will now be described.

The first object of the invention is to make it possible for a user 18 to reproduce, by means of the loudspeaker 36 (primary loudspeaker or secondary loudspeaker, in "conference" mode) of his mobile phone 20, the encrypted acoustic accreditation generated by the remote site 10.

For that purpose, the user places his mobile phone 20 in the vicinity of the microphone 46 of the lock 22 he wants to unlock and triggers the emission, as an audio signal, of the acoustic accreditation. The latter, being picked up by the microphone 46 of the lock, will be analyzed by the microcontroller 38 that, in case of compliance, will operate the unlocking of the mechanical members 40.

The matter is to make it possible for the user, owner of the number of the mobile phone 20 known by the database 12, to give to the lock 22, also known by this same database 12, the proof that he has actually the identity he declares, and that he has the access rights allowing the opening of this lock. The audio signal reproduced thus forms a proof of the user's identity and opening rights, hence the term "acoustic accreditation". Such acoustic accreditation is further encrypted (by cryptographic means known by themselves), and is of single use, so as to avoid any fraud, in particular by duplication, because it would be very easy to record the acoustic signal and to thereafter reproduce it at will.

1°) In-Line Mode (Direct Delivery of the Accreditation)

When he desires to obtain the opening of the lock 22 in front of which he is standing, the user 18 contacts the management site 10 by any suitable means. This may be obtained by calling a phone number, or by sending a message (SMS, MMS, e-mail, instantaneous messaging, etc.) to the server, which will call back the user's phone to deliver him the authorization as an encrypted acoustic accreditation. The transmission of this accreditation is carried out immediately and directly. The transmission of the acoustic accreditation may also be carried out through a method of the "call back" type: in this case, the user enters in telephonic contact with the management site that does not answer immediately, but that, after hanging up, makes the mobile phone 20 ring so that the user can once again establish the contact with the site, and this is at that moment that the acoustic accreditation is delivered to him.

In this embodiment, whatever the way the user enters into contact with the remote site, the latter delivers the acoustic accreditation directly to the user, "in-line", without intermediate storing.

This embodiment is particularly simple to implement, insofar as it just requires the use of the existing infrastructure, without a previous adaptation of the phone, in particular without the need to load an applet, notably of the midlet or cardlet type.

Hence, the invention may be implemented with any type of mobile phone, even a very simple one, and without any previous intervention on the latter. Another advantage lies in the possibility to check in real time the accreditation validity, with for example the possibility to immediately take into account a "black list" of users or locks. It will be observed in particular that, if the lock is an autonomous and independent lock, which is the most often case, it will not be possible to obtain information exchange between the server and the lock by means of the latter.

Moreover, with this in-line mode, it is possible to have, at the management site, much information about the use of the acoustic accreditation, in particular the date and time of use, and possibly the geographic location of the user (by identifying the cell of the network from which the user calls).

On the other hand, this mode requires having access to the mobile network, which is not always possible (underground parking lots, non-covered areas, etc.). Moreover, in principle, it does not make it possible to have, for selection by the user, several accreditations corresponding to several possible locks, insofar as it is necessary to have a "one-to-one" match between accreditation and lock.

2°) Semi-In-Line Mode (Delayed In-Line Mode with Download)

This mode can be used in particular if the access to the network is not ensured at the moment of use. In this case, the user connects in advance to the management site and receives from the latter a predetermined number of acoustic accreditations. These accreditations are securely stored in the phone or in a peripheral memory of the phone (for example an SD or MicroSD card).

When the user wants to reproduce an acoustic accreditation in order to open a lock, he initiates an application integrated to his phone, which finds the first accreditation among those that have been stored, reproduces it to open the door, and cancels it from the memory. And so on, in order to use the following accreditations.

The application providing this implementation is an applet stored in the phone, previously sent to the latter by the mobile network operator, or by download on an external medium (SD or MicroSD card), or via an Internet connection. In case of download via the mobile network operator, the management site will have beforehand sent a message, for example of the "push SMS" or "WAP push" type, to the phone, in order to identify the brand and model of the latter and to present to the user a link for down-loading the applet.

When the stock of accreditations memorized in the phone has been used out, or is almost exhausted, and the user is again capable of accessing the network, this stock of accreditations is reloaded for later uses.

It is possible to take advantage of the connection to the network to send, at the same time, return information to the management site, in particular a dated history of use of the previous accreditations.

To revoke a user, several solutions can be contemplated:

- waiting for the expiry of the accreditations (each accreditation having an expiry date);
- blocking the reloading function for this phone;
- sending to the lock, by the mobile phone of another user, a specific revocation accreditation, which will be stored in the lock to prevent the operation of the latter when the revoked user will try to obtain the opening thereof;
- specific programming of the lock, with on-site intervention of an administrator that will cancel the access rights of the user for that lock.

3°) Off-Line Mode

In this mode of implementation, the acoustic accreditations are generated locally, by the phone itself. For that purpose, the phone contains an applet, in particular of the cardlet (stored on the UICC card 34) or midlet (stored in the memory 32 of the phone) type. Such applet is downloaded by any suitable means, in the same manner as that used in the previous mode of implementation: download via the mobile operator, via Internet, etc., or pre-loaded in the phone when the latter is bought.

The management site 10 sends "accreditation data" to the phone 20, such data being no longer the acoustic accreditation itself but a cryptographic key stored in the UICC card 34 for reasons of security. The cryptographic key, combined with the applet, will provide a cryptographic generator within the phone 20. When the user desires to obtain the opening of a lock, he triggers the generation of the acoustic generation by the internal applet and the reproduction thereof by the transducer of his phone.

By the way, it will be observed that the storage in the UICC makes it possible to revoke the user's access rights via the mobile network checking this UICC.

The security of the system may be increased by a user's rights validation process, by means of a validation bit in the UICC card. This validation bit may be, for example, sent by the network in a non-prompted manner, at regular intervals (or not). As a variant, the phone may request from the remote management site the sending of the validation bit when a certain number of predetermined conditions are fulfilled. In any case, if the validation bit is not obtained, the user is immediately revoked.

As in the previous case, other modes of revocation are possible:

- waiting for the expiry of the accreditations;
- sending a specific revocation accreditation to the lock by a third party;
- on-site intervention of an administrator, on the lock, for cancelling the user's rights.

4°) "Attachment file" Mode

This mode of implementation is a variant of the semi-in-line mode.

The difference lies essentially in the fact that the accreditations are not sent by the voice channel of the mobile phone network, but in the form of a file attached to a message of the e-mail, MMS or instantaneous message type.

The advantage of this solution is the use of the file download means pre-existing in the phone, in particular with the phones comprising elaborate functions of the "smartphone" type, and without the need to previously download a specific applet, to store it in the phone and to make it execute by the latter when needed.

5°) Mixed Modes

Various adaptations and variants of the above-described modes may be encountered.

Thus, it is possible to combine several modes together for delivering the acoustic accreditation. For example, the system may impose that the first opening of a lock by a given user is necessarily operated according to a direct "in-line" mode, with the following accesses being on the other hand operable according to other modes, for example "semi-in-line" or "off-line" modes.

The system may also impose to the user that, at a certain predetermined frequency (for example, once every N), the opening is necessarily operated according to an "in-line" mode, with the other uses being operable by means of the other modes.

6°) Complementary Validation

Another precaution making it possible to increase the security consists, whatever the mode of implementation that is chosen, in providing an additional validation by the user, for example:

- input of a personal code of the "PIN code" type before the delivery of the acoustic accreditation, either at each use, or once every N, or at regular time intervals;
- validation of the biometric type, by means of a biometric reader incorporated in the phone or by a voice print recognition system using the phone's microphone. A specific biometric print is stored in the memory 32 of the phone or in the UICC card 34, or in the database 12 for being processed by the remote server. The frequency of biometric validation may be chosen too: at each use, once every N uses, at regular intervals, etc.

Improvements and Supplements of Implementation

Information Return

Such improvement consists essentially in using the mobile phone to pick up signals emitted by the lock, so as to transmit information from the lock to the management site via the phone of a user and the mobile network, taking advantage of the establishment by this user of downlink connection (from the management site to the lock) to return information in the reverse direction (from the lock to the management site).

It is indeed very useful that the management site can access information memorized in the lock, for example state data (anomaly indicator, battery charge indicator, opening proof, etc.) or history data about the successive uses of this lock.

The improvement of the invention applies specifically to the locks of the "stand alone" type, i.e. operating fully autonomously without being connected to any network that would permit it to exchange data.

It is possible to use the transducer 46 of the lock by making it operate in a reversed mode (emitting audio signals instead of picking them up), or to provide a specific transducer for reproducing audio signals.

The information return may be triggered by an administrator of the system, by means of an applet downloaded on his mobile phone. When he desires to get back data about a lock, he presents his phone to the lock and delivers a specific acoustic control signal that commands the lock, with all the required guaranties of security, to send back the required information. Such information are transmitted in return in the form of acoustic signals, encrypted or not, reproduced by the lock's acoustic transducer. The signals are then picked up by the phone's microphone and processed by the applet loaded in the latter, for immediate or subsequent transmission to the management site.

The information return may also be operated without requiring the coming of an administrator to the site where the lock is located, taking advantage of the fact that an authorized user requests the lock opening. For that purpose, during the opening process triggered on initiative of the user, the lock sends in return to the user's phone relevant information such as low battery signal, need for maintenance, dysfunction, opening proof, etc. Such information may be translated by the phone's applet into alert messages ("low battery") displayed on the phone's display screen, such alert messages being repeated if necessary at regular intervals. Another possibility consists in sending the information to the management site via the mobile network, so that an administrator can then take the suitable corrective actions.

In other words, each user becomes a source of information for the system, which is particularly advantageous in the case of fully autonomous locks.

In a variant of this improvement, the control signal, instead of being delivered by the phone, is emitted by a general audio equipment of the building, which makes it possible to transmit this signal simultaneously to a very large number of locks. This same equipment may be equipped with microphones also capable of listening to the signal delivered by the locks.

Burst Multiple Accreditations

When a user has the access rights for a plurality of different locks, he normally has to manually choose, in a list that is presented to him on the display screen of his phone, the type of lock which he desires to open, so as to obtain the emission of a corresponding compliant accreditation.

An improvement consists, in order to avoid this manipulation, in making the phone deliver a plurality of accreditations within a single burst, wherein the burst contains one respective accreditation for each of the locks for which the user is authorized. Among the multiple accreditations that will be picked up by the lock, the latter will recognize, by means of a suitable code, the accreditation that concerns it, and that is this accreditation, and only this one, that will be afterward usable to operate the opening of the lock.

Fast Access (Speed Dial)

It is possible and advantageous to trigger the emission of the acoustic accreditations by the phone by pressing a dedicated button or key on the phone, or by activating a specific icon in the case of a touch-screen phone.

In the "in-line" mode, the user assigns a button or an icon to this function, which will trigger the dialing of the call number of the server and will permit him to receive the acoustic accreditation in return. In the "semi-in-line" or "off-line" modes, the applet (cardlet or midlet) prompts the user to automatically or manually choose the button or icon he desires for obtaining rapidly the acoustic accreditation by the above-described method.

Application: Hotel Management

Figure 3:
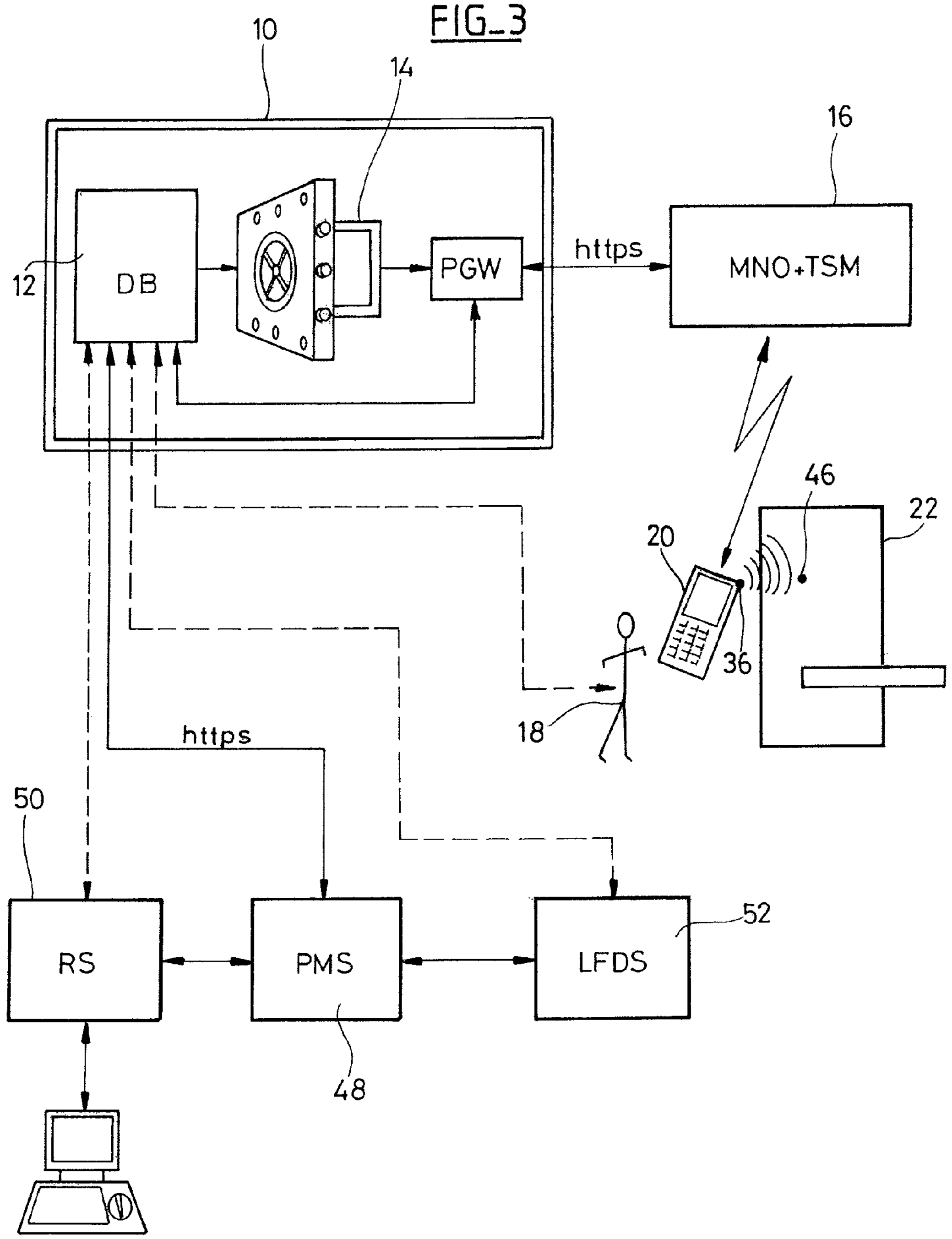
FIG. 3 illustrates how to apply the invention to the management of a set of hotel rooms, in a fully automatic manner and without the need to deliver cards, badges or keys to the guests.

The application to the management of keys in a hotel will be described with reference to FIG. 3. This figure illustrates all the various elements of FIG. 1, to which are further associated:

- a system 48 for management of the establishment, or PMS (Property Management System), which is a conventional hotel management system, herein connected to the database 12 of the management site 10 by a secured connection, for example an Internet connection of the https type,
- a system 50 for hotel reservation, or RS (Reservation System), which is a system making it possible for any user connecting to it to obtain a reservation in a hotel of his choice and to provide the various pieces of information required for registering this reservation. The RS reservation system is coupled to the PMS establishment management system 48, and possibly to the database 12 of the management site 10,
- a system 52 for creation of room cards, or LFDS (Lock Front Desk System), permitting the registration of the user when the latter arrives or checks-in at the hotel, either by a receptionist or directly by the user in case of a self-service system. The LFDS system is connected to the PMS system 48 and possibly to the database 12.

The various steps of this hotel application will now be described, with particular emphasis on the features resulting from the use of the system according to the invention (for the remaining, the process implemented is a conventional process, which will be shortly described).

1°) Reservation

The RS hotel reservation system 50 communicates with a database indexing, among the hotels proposed, those which are suitably equipped to implement the method of the invention.

The guest makes a reservation with the RS system 50 by any conventional method: Internet, WAP application with his phone, phone call, via a travel agency, etc. During the reservation, the RS system checks if the requested hotel can operate with the acoustic accreditation system according to the invention. In the affirmative, this option is offered to the guest that asks for the reservation, and the latter can accept this proposition by a conventional method of acceptance of "terms and conditions" of this particular service.

The guest then communicates some pieces of information to the RS system, comprising in particular:

- personal information (name, etc.)
- credit card number,
- possible fidelity card number,
- passport or ID card number,
- mobile phone number,
- electronic address (e-mail he can receive on his mobile phone, instantaneous messaging identifier).

At the end of the reservation process, the guest receives a confirmation message, informing him that he will be able to obtain directly the delivery of his room key by means of his mobile phone, without the delivery of a badge or a card at the reception when he arrives at the hotel. He may also receive the applet (midlet or cardlet) required in case of implementation by a "semi-in-line" or "off-line" mode.

If the guest does not yet participate to a loyalty program, the system may propose him to subscribe to it, wherein such loyalty program can notably include enjoying the system of the invention, which will make it possible to obtain the key delivery in the form of an acoustic accreditation.

2°) Preparation of the Guest Reception

Once the guest has made his reservation and accepted to receive his key as an acoustic accreditation on his mobile phone, the RS reservation hotel system 50 communicates to the PMS establishment management system 48, the details of the reservation, in particular the fact that this reservation includes the delivery of a key as an acoustic accreditation.

The RS system 50 also informs the PMS system 48 of the mobile communication means chosen by the guest (mobile phone number, e-mail on his mobile phone, instantaneous messaging). A room allocation priority level may also be allocated to the reservation.

At the same time, the RS reservation system 50 or the PMS system 48 informs the management site 10 of the reservation, by sending it the following pieces of information:

- mobile phone number,
- electronic address,
- arrival and departure dates,
- reservation number,
- hotel details.

3°) Activation Before the Guest Arrival

This phase consists essentially in allocating a room to the guest for the duration of his stay, and making the management site generate a corresponding encrypted acoustic accreditation. The latter may be ordered in several manners.

a) Order on Initiative of the PMS Establishment Management System

The PMS establishment management system 48 firstly allocates a room number and sends the following pieces of information to the LFDS room card creation system 52:

- room number,
- mobile phone number,
- electronic address,
- arrival and departure date,
- reservation number.

The LFDS system 52 then generates a virtual key for this chamber and this period, and sends the following pieces of information to the management site 10, via a secured connection:

- data string corresponding, in an encrypted form, to the virtual key of the room,
- mobile phone number,
- electronic address,
- arrival and departure date,
- reservation number,
- hotel details.

The management site 10 acknowledges receipt of the information and translates into an acoustic accreditation, generated by the generator 14, the data corresponding to the virtual key of the room.

The management site 10 then sends to the mobile phone of the client a message (SMS, e-mail or instantaneous messaging) informing him of the room number allocated to him and of the phone number he will have to dial when he will be in front of the room door so as to obtain the acoustic accreditation allowing him to enter this room. As a variant, the management site may send the acoustic accreditations as an attached file (by MMS, instantaneous messaging or e-mail), a file that will be open by the guest to reproduce the acoustic accreditation when in front of the room door.

In a variant of this first solution, the data string corresponding to the virtual key of the room, instead of being sent by the LFDS system 52, is sent by the PMS system 48, which send this data string to the management site 10, the remaining operations staying unchanged.

In another variant of this first solution, the data string, instead of being sent to the management site 10 by the LFDS system 52, is sent via the RS reservation system 50, thus avoiding the use of a specific secured connection between the LFDS system 52 and the management site 10.

b) Order with Pre-Registering

In this other solution, the management site 10 sends to the guest, on his mobile phone, a little before his arrival at the hotel, pre-registering information with a link to which he will have to connect, or a phone number to dial, in order to confirm the registration. The pre-registering information may be sent by an SMS of the "push SMS" type, by e-mail or by instantaneous messaging.

The guest can accept the registering at any time by clicking on the link or by calling the phone number indicated to him. The management site 10 then informs the PMS system 48 of that registering acceptance, which the PMS system will then be able to execute in the above-described manner.

c) Manual Order

In this other solution, the activation is generated manually. For that purpose, before the arrival of the guest at the hotel, an operator connects via Internet to an application of a hosted application provider, ASP (Application Service Provider), and provides it the following pieces of information:

- room number that has been allocated,
- mobile phone number of the guest,
- electronic address of the guest, arrival and departure dates,
reservation number,
hotel details.

The application of the ASP provider communicates the corresponding data to the management site 10, and the latter can then either send pre-registering information to the guest, on his mobile phone (see above), or send him directly the room number information and the information he will need to obtain the acoustic accreditation when he will be in front the door of this room.

The above-described variants, for example sending acoustic accreditations as an attached file, can also be applied to this manual implementation.

4°) Accreditation Delivery

The guest arrives at the hotel and goes directly to his room. The acoustic accreditation can be delivered to him by several ways:

- the guest calls the phone number that has been indicated in the message he has received (by clicking directly on the link or by dialing the phone number), to obtain and reproduce the acoustic accreditation;
- as a variant, the management site does not answer directly but delivers a message acknowledging the receipt of the call and asking the guest to hang up; the management site calls back the guest immediately after and delivers to him the acoustic accreditation;
- in "attachment file" mode, the guest opens the audio file he has received from the management site by e-mail, instantaneous messaging or MMS, so as to reproduce the acoustic accreditation;
- in "semi-in-line" or "off-line" mode, the guest initiates the application that will permit him to reproduce the acoustic accreditation.

5°) Door Opening

The guest brings his mobile phone in the vicinity of the door lock, which is provided with a system for listening to the phone. The lock translates the acoustic accreditation into an unlocking authorization. If the acoustic accreditation is compliant, the lock unlocks and the guest just has to open the door, in the same way as he would have done with a badge that would have been delivered to him at the hotel reception.

The same process is repeated at each opening of the door during the stay at the hotel. The guest can possibly obtain at the reception a badge that he will be able to use in addition to his mobile phone.

All the transactions are of course recorded so that a history of use of the lock can be established.

6°) Return of Information

When the guest receives the acoustic accreditation from the management site 10, the later informs the PMS system 48 that the accreditation has actually been delivered to the guest, and at which time. In the "semi-in-line", "off-line" and "attachment file" modes, the management site 10 can also generate a return of information to the PMS system 48.

7°) Particular Cases

The system provides easy management of various particular cases.

When the guest reserves, he can inform the system that several other persons will be liable to also access the room. He then indicates that the mobile phone numbers and the electronic addresses of the other persons, so that each of them can also receive an acoustic accreditation for the anticipated duration of the stay.

Moreover, the guest can at any time ask the hotel reception, or automatically by the LFDS system 52, the delivery of a "duplicate" of his acoustic accreditation in the form of a badge. The badges are able to operate in parallel with the acoustic accreditations reproduced by the mobile phone.

Finally, in case of loss or stealing of his mobile phone, the guest will inform the hotel reception or his mobile operator so that a replacement badge can be delivered to him. Once the badge is used for opening the door, the previous acoustic accreditations are revoked by the system.

8°) Departure

Several solutions can be implemented.

For example, the departure can be registered via the internal television system of the hotel, with a payment by credit card. For that purpose, the guest selects the "check out" option of the internal television system, which makes appear his bill on the screen of the television set. He then accepts this bill by clicking on an "acceptance" button, which triggers the establishment of a credit card payment form. The guest fills or completes the form with all the required information and validates the payment.

According to an improvement, the management site 10 is involved in the payment validation process, by delivering an acoustic accreditation signal via the payment application. This acoustic accreditation is reproduced by the loudspeakers of the television set located in the client room, and at the same time, the management site 10 dials the mobile phone number of the guest. The latter answers and brings his phone in front of the loudspeakers of the television set, which "closes the loop" of the process and makes it possible to validate the payment, with the authorization of the management site 10.

In still another variant, instead of using the internal television circuit of the hotel, the guest is only asked to pick up the phone of his room and to dial a number corresponding to the "check out" function. Once in communication with the corresponding service, the guest validates his acceptance of the bill by transmitting to this service, via his mobile phone, the acoustic accreditation he used for opening his door. This operation is interpreted as an acceptance of the bill, the amount of which will be debited on the credit card of the guest.

In all the cases, an e-mail is sent to the guest, mentioning the actual receipt of the payment and giving the details of the bill. The guest can also obtain a paper copy of the bill at the reception of the hotel or with a machine located at the reception.

The invention claimed is:

1. A secured system for controlling the opening of lock devices, comprising:

- at least one lock device provided with electronic circuits for controlling locking/unlocking mechanical members;
- a mobile phone at the disposal of a user authorized to open the lock device;
- a remote management site; and
- a mobile network operator, coupled to the management site and to the mobile phone, the system being characterized in that:

- the remote management site comprises:
  - a database of lock devices and authorized users with, for each user, a unique identifier associated with a mobile phone number, and data about access rights and conditions of use, and
  - a generator of accreditation data, the accreditations being encrypted acoustic accreditations in the form of single-use audio signals, adapted for allowing the opening of the lock devices that are indexed in the database;
- the system comprises means for secured transmission of said accreditation data from the management site to the mobile phone of the corresponding authorized user;

the phone comprises an electroacoustic transducer capable of reproducing said acoustic accreditations;

the lock device comprises an electroacoustic transducer capable of picking up the acoustic accreditations reproduced by the phone's transducer previously placed in the vicinity of the lock device; and the lock device comprises means for recognizing, analyzing and authenticating the acoustic accreditations picked up by the transducer, and operating the unlocking of the mechanical members upon recognizing a compliant accreditation.

2. The system of claim 1, comprising means adapted for, upon the sending of a request by the mobile phone to the management site:

verifying the user's authorization in the database of the site;

generating an acoustic accreditation by the generator of the site; and transmitting said accreditation to the phone, for direct reproduction by the transducer of the latter previously placed in the vicinity of the lock device's transducer.

3. The system of claim 1, comprising means adapted for, upon the sending of a request by the mobile phone to the management site:

verifying the user's authorization in the database of the site, generating at least one acoustic accreditation by the generator of the site, transmitting said accreditation(s) to the phone, by implementing an internal applet of the phone capable of performing the download and memorization thereof into a memory of the phone, and, in a second time:

activating the internal applet for reproducing the accreditation, or one of the accreditations, by the phone's transducer previously placed in the vicinity of the lock device's transducer.

4. The system of claim 1, wherein:

the phone comprises an internal applet forming, in combination with a cryptographic key, a cryptographic generator, the accreditation data transmitted by the remote site to the phone is said cryptographic key, so as to operate, upon a request from the user, the generation of an acoustic accreditation by the internal applet and the reproduction thereof by the phone's transducer previously placed in the vicinity of the lock device's transducer.

5. The system of claim 4, wherein the cryptographic key, and possibly the applet, are stored in a memory of a secured microcircuit card of the phone.

6. The system of claim 4, further comprising means for conditioning the generation of the acoustic accreditation by the internal applet of the phone to the updating, by the remote site, or by the mobile network operator, of a validation data required so that the applet can continue performing said generation.

7. The system of claim 1, comprising means adapted for, upon the sending of a request by the mobile phone to the management site, or on initiative of the management site:

verifying the user's authorization in the database;

generating at least one acoustic accreditation and converting said accreditation(s) into an audio file;

transmitting said audio file to the phone for download and memorization into a memory of the phone;

and, in a second time:

reproducing the audio file by the phone's transducer previously placed in the vicinity of the lock device's transducer.

8. The system of claim 3, further comprising means for automatically generating said request from a predefined threshold of accreditations remaining memorized in the phone, so as to operate a reloading of the phone memory with new accreditations.

9. The system of claim 1, further comprising means for conditioning the reproduction of the acoustic accreditation by the phone's transducer to the previous presentation of a personal validation data delivered by the user to the phone.

10. The system of claim 1, wherein:

the lock device comprises an electroacoustic transducer capable of reproducing return acoustic signals, generated by the lock device and coded with state or history data peculiar to the lock device; and the phone comprises an electroacoustic transducer capable of picking up said return signals.

11. The system of claim 10, wherein:

the phone further comprises means for decoding said return signal and displaying, if need be, to the user, an alert message based on said state or history data peculiar to the lock device.

12. The system of claim 10, wherein:

the phone further comprises means for transmitting to the management site said return signals with said state or history data peculiar to the lock device.

13. The system of claim 1, wherein:

the user is authorized for a plurality of different lock devices;

the phone is capable of reproducing a plurality of accreditations within a single burst, said burst containing an accreditation corresponding to each of the lock devices for which the user is authorized.

14. The system of claim 1, wherein:

the phone further comprises a fast access feature for obtaining and/or reproducing the accreditation by pressing a dedicated button on the phone or by activating a specific icon of a touch surface of the phone.

15. The system of claim 1, wherein the system is also capable of controlling the activation/deactivation of an alarm equipment upon recognizing a compliant accreditation.

* * * * *